United States Patent Office.

SAMUEL DANKS, FOR HIMSELF, AND JOSEPH C. BUTLER AND LEWIS WORTHINGTON, OF CINCINNATI, OHIO, ASSIGNEES OF SAMUEL DANKS.

*Letters Patent No.* 68,715, *dated September* 10, 1867; *reissue No.* 3,325, *dated March* 16, 1869.

IMPROVED LINING OR FIX FOR PUDDLING AND BOILING-FURNACES.

The Schedule referred to in these Letters Patent and making part of the same.

*To all whom it may concern:*

Be it known that SAMUEL DANKS, of Cincinnati, in the county of Hamilton, and State of Ohio, has invented a new and useful Improved Lining or "Fix" for Puddling and Boiling-Furnaces, of which the following is a full and clear description.

The nature of the invention consists in mixing an alkali or alkalies, or lime, common salt, separately or combined, with cinder of the puddling or boiling-furnace, while in a fluid state, or when pulverized, after tapping from the furnace, the said mixture to be used as a "fix" for the puddling or boiling-furnace.

Alkali or alkalies, lime or salt, may be mixed with pulverized or melted iron-ore, for "fixing" puddling or boiling-furnaces.

A quantity of good quick-lime is, preferably, dissolved in a vessel, with water, (or common brine of suitable saline strength,) to the consistency of very thick cream, to which are added iron-ore and scale-mixture, in such proportions, that for every three pounds of silica that are in or to be removed from the iron or iron-ore, there shall be combined with it two pounds of lime, common salt, or alkali or alkalies, mixed in any desirable manner, and applied when needed.

What is claimed as new, is—

The use of puddlers or boilers, tapping-cinder, squeezer-cinder, or hammer-cinder, or pulverized or melted iron-ore, when mixed with an alkali or alkalies, or lime, common salt, soda, or potassa, separately or combined, in the manner, and in the relative proportions, substantially as and for the purpose specified.

SAMUEL DANKS.
JOSEPH C. BUTLER.
L. WORTHINGTON.

Witnesses:
CHARLES L. FISHER,
SAM'L E. CRAWFORD.